(12) United States Patent
Geigle et al.

(10) Patent No.: US 6,270,025 B1
(45) Date of Patent: Aug. 7, 2001

(54) APPARATUS FOR BREAKING AND SEPARATING PARTICLES

(75) Inventors: William Lawrence Geigle, West Chester, PA (US); Steve Irwin Gleich, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/380,424

(22) PCT Filed: Mar. 9, 1998

(86) PCT No.: PCT/US98/04598

§ 371 Date: Sep. 1, 1999

§ 102(e) Date: Sep. 1, 1999

(87) PCT Pub. No.: WO98/41335

PCT Pub. Date: Sep. 24, 1998

Related U.S. Application Data
(60) Provisional application No. 60/040,761, filed on Mar. 14, 1997.

(51) Int. Cl.$^7$ .................................................. B02C 19/12
(52) U.S. Cl. .................................. 241/3; 241/24.1; 241/74
(58) Field of Search ........................ 241/74, 85.3, 24.18, 241/24.28, 3, 24.1

(56) References Cited

U.S. PATENT DOCUMENTS

| | | |
|---|---|---|
| 3,549,014 | 12/1970 | Sponza . |
| 3,672,505 | 6/1972 | Feterl . |
| 4,904,377 | 2/1990 | Datta . |

FOREIGN PATENT DOCUMENTS

| | | |
|---|---|---|
| 1208161 | 2/1965 | (DE) . |
| WO97/00608 | 1/1997 | (WO) . |

*Primary Examiner*—Mark Rosenbaum

(57) ABSTRACT

An apparatus for breaking and separating particles preferably having a mathematical average length to diameter ratio of 1.0 to 4.0, and compositions comprising such particles. The apparatus comprises a cylindrical screen (1) and a hub (7). Upon relative rotation of the screen (1) and the hub (7), reject particles are flung radially outwardly and expelled through openings (4) in the screen (1).

8 Claims, 1 Drawing Sheet

APPARATUS FOR BREAKING AND SEPARATING PARTICLES

CROSS-REFERENCE TO RELATED APPLICATIONS

This application was filed under 35 U.S.C. 371 from International Application No. PCT/US98/04598 filed Mar. 9, 1998, which claims priority benefit from U.S. Provisional Application No. 60/040,761 filed Mar. 14, 1997.

BACKGROUND OF THE INVENTION

The present invention pertains to a process for breaking and separating cylindrical particles of a wide length distribution into fractions preferably having a specific length to diameter ratio. Physical blends of granular pesticidal products are becoming increasingly important in agriculture as a simple means to customize product offerings without costly registration of multiple formulations (as described in WO 9700608 A1).

U.S. Pat. No. 3,549,014 issued Dec. 22, 1990, discloses a device for screening pulverulent material comprising sifting or screening means having substantially the shape of a surface of revolution or of a drum. WO-A 97 00608 discloses a homogeneous mixture of cylindrical granules of one or more groups having substantially uniform diameters and a longitudinal length of no more than 8 times the diameter with the average length being 1.5 to 4 times the diameter but gives no guidance on how to consistently produce such a size distribution.

Preventing or at least minimizing segregation of these physical blends is critical. When making substantially homogeneous (i.e. uniform) blends, admixture of cylindrical granules as opposed to spherical granules is particularly advantageous. A substantially uniform blend is formed when two or more cylindrically shaped granular materials have a similar and relatively narrow range of average lengths.

To minimize segregation in a blend of cylindrical granules, the granules have preferably substantially the same diameter. As cylindrical pesticidal granules are typically produced by an extrusion process, the diameter is defined by the orifices in the die which can be chosen at will and thus matched precisely.

Further in regard to minimizing segregation in a blend of particles such as cylindrical granules, the lengths of the granules are preferably matched as closely as possible. If the lengths of the resulting "as-made" granules are sufficiently different, post granulation processing is necessary to ensure homogeneity.

The predominate extrusion method for agricultural pesticides is paste extrusion. With paste extrusion, the moistened formulation is forced through a die and the strands of extrudate are simply allowed to break off naturally into random lengths. The extrudate is typically dried in a fluid bed device wherein the strands can break down further but are still of widely varying length. The breadth and median size of the length distribution can vary with each formulation.

The other extrusion method used for agricultural pesticides is melt extrusion wherein heated formulation is forced through a die and the incipient strands of extrudate are cut to consistent length at the dieface. With this method, both diameter and length are controlled and the "as-made" granules are uniformly sized. However, melt extruded formulations are not yet widespread in the agricultural industry and the known method for controlled sizing of paste extruded granules is not particularly effective.

It is an objective of this invention to provide a process for post-granulation sizing of particles such as extruded granules, especially paste extruded granules, to obtain a relatively narrow range of length to diameter ratios.

It is a further objective to perform said sizing with high conversion to the desired length so that there are few fines which require recycle to the granulation step.

It is a further objective to provide an apparatus which is capable to separate the desired product cut from the unwanted sizes of particles.

It is a further objective to provide a process which is controllable and can provide desired length to diameter ratios and length profiles on a wide range of formulations with differing initial granule length distributions.

Another objective is to define a particle composition obtainable by use of the apparatus according to the invention.

SUMMARY OF THE INVENTION

The present invention pertains to a process for breaking dried particles and separating product particles from reject particles, comprising:

(a) feeding dried particles into an apparatus having
  (i) a substantially elongated hollow cylindrical screen (1) having a plurality of radial openings (4), each with a diameter smaller than the diameter of product particles;
  (ii) an axially extending interior passage (3) formed radially inwardly of the cylindrical screen (1), wherein the radial openings (4) extend from the interior passage (3) through the screen (1), the interior passage (3) having an inlet (2) at one axial end thereof for receiving product and reject particles and an outlet (10) at the other axial end thereof for expelling product particles;
  (iii) a hub (7) disposed in the interior passage (3), wherein, upon relative rotation of the screen (1) and the hub (7), reject particles inside the interior passage (3) are flung radially outwardly and are expelled through the radial opening(4) to the screen (1) and product particles moved to the product particle outlet (10); and a reject particle outlet (14) disposed radially outwardly of the screen for collecting reject particles expelled through the radial openings and;
removing the product particles wherein said particles have a mathematical average length to diameter ratio of 1.0 to 4.0. The tangential velocity of the rotor surface is preferably from 3 to 15 m/s.

Another embodiment of the present invention pertains to a composition comprising paste extruded substantially cylindrical particles having a mathematical average L/D (length to diameter) ratio of 1.0 to 4.0 with a standard deviation of less than 1.0. Preferably, paste extruded cylindrical granules have an average L/D ratio of 1.5 to 2.8, and in particular from 1.8 to 2.7.

DETAILS OF THE INVENTION

Figure 1:
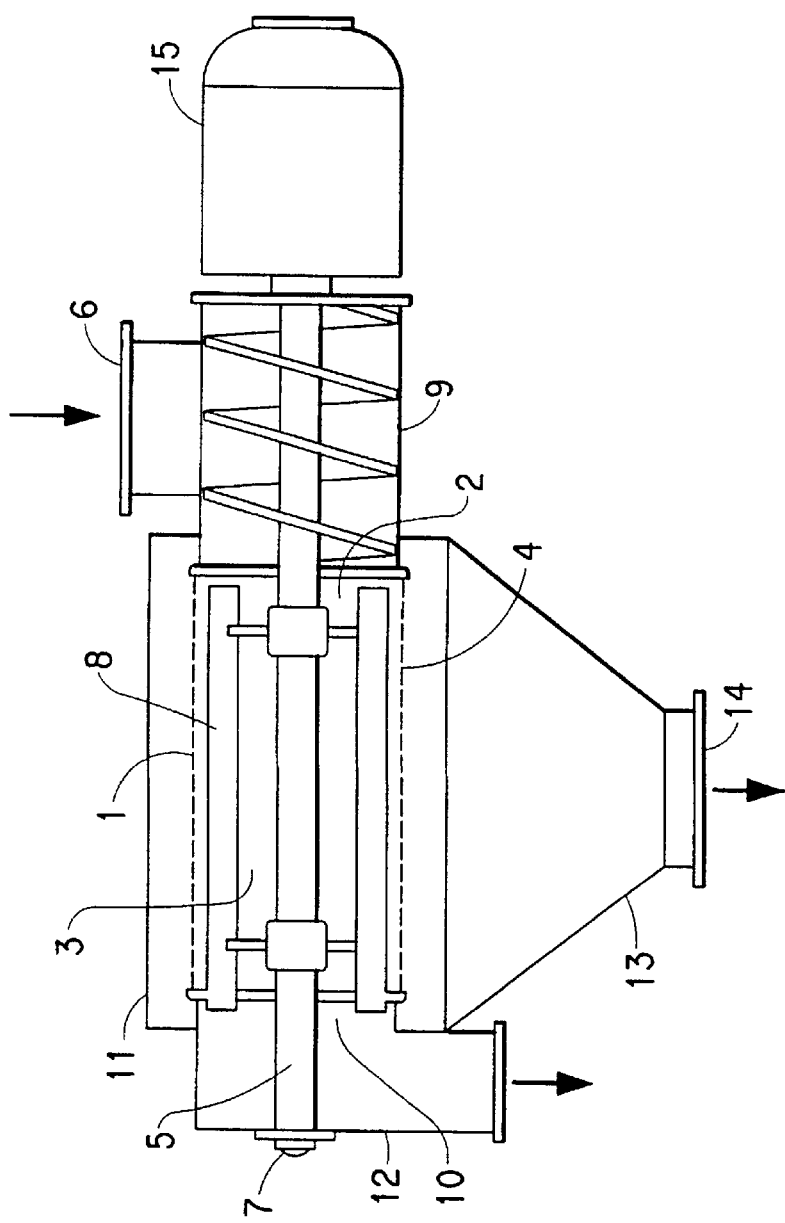
FIG. 1 is a side elevation view of an apparatus for breaking and separating particles.

The present invention pertains to a process for breaking cylindrical granules of a wide length distribution and then separating these particles into a uniform length distribution.

This process is advantageous for preparing substantially uniform granular blends. Granules as typically produced by paste extrusion are longer and less uniform than desirable for such granular blends. Simply crushing and sieving the as-made extrudate, normally done for example by a Stokes granulator, is unsatisfactory because a significant fraction of granules are lost to fines and a number of unacceptably long granules make it through to the product cut. Standard vibratory sieving cannot effectively separate long cylindrical granules from short ones. It has surprisingly been found that application of a centrifugal sifter after drying reproducibly breaks down the extrudate strands into granules of a uniform length distribution with little loss to fines and few, if any, undesirably long granules being recovered in the product cut. The superior conversions of centrifugal sifting versus a Stokes granulator is demonstrated hereafter.

Centrifugal sifters are widely used for the continuous separation of unwanted over-sized particles from fine powders such as powdered food products, pharmaceuticals, and milled agricultural products.

One such centrifugal sifter, Kason Model MO, can be purchased from Kason Corporation, Linden, N.J. The KEK laboratory Centrifugal Sifting Machine can be purchased from Kemutec Inc, Bristol, Pa.

The particles to be sized are usually, but not necessarily, dry, paste-extruded granules and typically contain one or more pesticidally active ingredients. A typical diameter is between about 0.5 mm and 3 mm, more usually 0.7 to 1.5 mm. The lengths vary considerably depending on formulation, and can range up to an average L/D (length to diameter) ratio of 8 or more.

According to the process of the present invention, preferably extruded, granular feed particles are fed to the sifter wherein the longer granules are cleaved into shorter ones such that the product particles are substantially more uniform in length. The cleavage is controlled by adjusting the tangential rotor speed. It has been surprisingly found that the rotor speed can be adjusted to selectively cleave larger granules into smaller ones without fracture of smaller granules into fines. Thus, substantially independent of the initial distribution of lengths, the final distribution of lengths of the product particles is defined by a mathematical average L/D of about 1.0 to 4.0.

With the present process, a granular product having a distribution of a mathematical average L/D of from about 1.5 to 8 could be treated so that the range is reduced to a mathematical average L/D of about 1.0 to 4 or even about 1.5 to 2.8. A granular product having a distribution of an average L/D of from 4 to 6 could be treated so that the range is likewise shifted down to an average L/D of about 1.5 to 4 or even about 1.5 to 2.8.

Any reject particles such as fines initially present or created in processing are separated from the product by means of openings in the screen with a smaller dimension than desired product particles. An advantage of the present process is that the size reduction can be performed with little loss of granular product to fines.

The present process can be operated so that substantially no relatively long granules pass through uncleaved. Avoiding "longs" is particularly advantageous because there is no convenient known process for separating long cylindrical granules from short ones.

With the present process recovered yields can be substantially greater than 90%. In contrast, a commonly used technique for reducing granule size, a Stokes granulator, provides only a 88% yield and allows more "longs" to escape—as evidenced by a higher standard deviation of length to diameter ratios than according to the present invention.

The uniformly sized granular product produced by the present invention can be mixed into homogeneous blends by simply taking the desired products in the proper ratio and blending them together in any conventional equipment.

Figure 2:
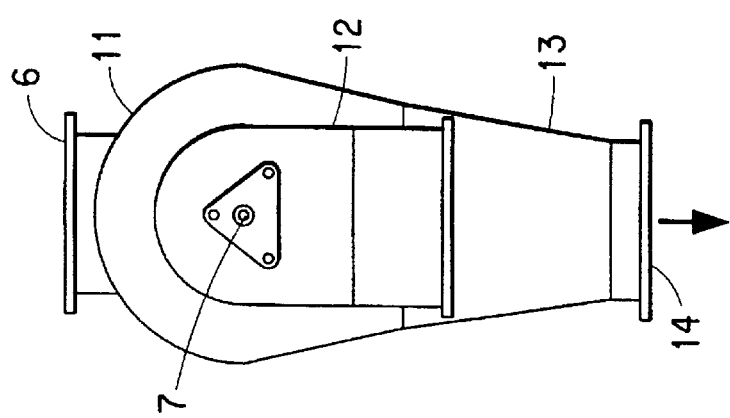
FIG. 2 is a left end view of the apparatus depicted in FIG. 1.

This invention can be more fully understood from the following description. Referring to FIG. 1, there is shown a side elevation of a single unit of a centrifugal sifting apparatus useful for separating particles such as selectively cleaving longer granules to smaller granules. The centrifugal sifting apparatus has separation means comprising a substantially cylindrical hollow screen (1) having an inner particle passage (3) and a radial outlet opening (4) extending through the screen (1) for expelling reject particles through the outlet openings (4) having a smaller dimension than product particles. Screen (1) may furthermore be enclosed by housing (11) comprising product particle outlet means (12) and reject particle collection means (13) having at least one outlet (14). The apparatus further comprises vanes (8) rotatable around hub (7). Feed particles are entered through feed inlet (6) at first axial inlet (2) into hollow screen (1), conveyed by vanes (8) driven by a motor (15) and screw feed (9) to the product particle outlet (10). Inside screen (1) centrifugal sifting during normal operation of the apparatus according to the invention breaks down particles such as long strands of cylindrical extrudate into particles having substantially uniform lengths, which product particles are removed at particle outlet (12). The tangential (tip) speed of the vanes (8) can preferably be varied by means of the motor (15). In a further embodiment of the apparatus according to the invention, the substantially cylindrical hollow screen (1) is rotatable around hub (7) and may comprise further transportation means (not depicted) for feed and/or product particles. The apparatus depicted in FIG. 1 is further shown in FIG. 2 as end view.

EXAMPLE 1

Using the commercial Classic® herbicide formulation, an extrudable mix was prepared by adding 40.5 g water to 500 g of powdered formulation and intensely blending the mixture in a food processor for approximately 3 minutes. The moist mix was extruded with a Fuji-Paudal DG-1 dome granulator using a 1.0 mm diameter die. One portion of resultant wet noodles was dried by static bed drying and another portion was dried by fluid bed drying. In each case the final moisture was less than about 1% by weight.

A portion of the static bed dried extruded product was fed to a KEK lab scale centrifugal sifter fitted with a 20 mesh (841$\mu$) opening nylon screen. The paddle assembly rotor speed was adjusted to 3000 RPM (11 M/sec. tangential speed). Of the X original charge, 93.7% was collected as finished, sized product larger than 20 mesh (841$\mu$). The sifter generated 6.2% fines collected in a permeable filter bag attached to the fines chute.

Granule size distribution was analyzed by image analysis. In this procedure, a scan is made of the finished product sample. A computer program calculates widths and lengths from the measured area and perimeter of each object. This data is then manipulated in a spreadsheet to generate mathematical averages of widths and lengths, standard deviations, and a curve representing the cumulative volume distribution of the finished product.

Image analysis of the finished product from the centrifugal sifter gave an average length of 2.5 mm with a standard deviation of 0.85. The static bed dried granules which was the feed material to the sifter had an average length of 25.4 mm with a standard deviation of 17.9.

EXAMPLE 2

Comparative

A portion of the extrudate from Example 1, which was fluid bed dried, was sized by vibratory sifting through 10 mesh (2000μ) and 20 mesh (841μ) screens. Of the material fed, 89.6% was collected as the desired 10/20 mesh product. The resultant product cut had an average length of 4.46 mm with a standard deviation of 1.78. Thus there is some narrowing of the size distribution over static bed dried material, but much less than is provided by the centrifugal sifter treatment of the present invention.

EXAMPLE 3

Comparative

A portion of the static bed dried extrudate from Example 1 was passed thorough a Stokes oscillating granulator fitted with a 6 mesh (3360μ) screen. The Stokes-treated material was then sifted through 10 mesh (2000μ) and 20 mesh (841μ) screens. Conversion to the desired cut was 88.0%. Finished product average length was 2.4 mm with a standard deviation of 1.03. Thus the centrifugal sifter of the present invention provides more uniformly (lower standard deviation) sized granules, and higher yields, than the Stokes granulator.

EXAMPLE 4

Using the same Classic® composition as in Example 1, 0.7 mm diameter dry extruded product was prepared in a continuous pilot scale paste extrusion unit. Crude product was fed to a pilot scale centrifugal sifter unit over a range of rotor speeds. Average length to diameter ratios varied from 2.9 to 1.8. A rotor speed of 650 RPM (8.6 M/sec.) was identified that produced finished product having a mathematical average L/D ratio of 2.1 in a 90% conversion, and 0.64 standard deviation.

EXAMPLE 5

A second product was processed through pilot scale equipment of the composition:

| Placebo Formulation: | |
|---|---|
| Nytal 200 | 51% |
| American Maize Starch A | 20% |
| Sugar | 25% |
| Morwet D425 | 3% |
| Morwet EFW | 1% | with 0.1% FD&C Blue Dye #1 added to the above blend to produce 1.0 mm diameter product. Initial length of this crude product was 3.13 mm with a standard deviation of 1.31. Crude product was fed to a pilot scale centrifugal sifter unit over a range of rotor speeds. Length to diameter ratios varied from 3.0 to 2.2. A rotor speed of 700 RPM (9.3 M/sec.) was identified that produced finished product having an average L/D ratio of 2.3 in a 95.9% conversion, and 0.79 standard deviation.

EXAMPLE 6

1.0 mm product of the Example 5 composition without blue dye was prepared in the pilot unit as referred to in Example 5. A blend of 187.5 g (37.5%) and 312.5 g (62.5%) of the products as obtained Examples 5 and 6, respectively, were prepared by mixing in a bottle. Once mixed, the bottle was subjected to vibration for 30 minutes to determine if segregation occurred. As the bottle was emptied, a total of 11 samples were taken: one at the beginning, one at the end, and equally throughout the emptying. The samples were analyzed for presence of blue dye and converted to a percent blue dye. Results indicate that for this mixture the percent blue extrudate remained constant to within 3% relative standard deviations.

EXAMPLE 7

Comparative

The experiment of Example 6 was repeated using product generated from fluid bed drying followed by standard vibratory sifting. Blue granule concentration varied considerably yielding a relative standard deviation greater than 10%.

EXAMPLE 8

Example 4 was repeated in a continuous pilot scale paste extrusion unit. In this example, an optimum speed of 750 RPM (10 m/sec) was identified that produced finished product having an average L/D ration of 2.1 and a standard deviation of 0.61 in a 96.4% conversion.

EXAMPLE 9

Pilot scale paste extruded Classic® herbicide of 0.7 mm diameter was sized using a Kason Model MOB sifter to an average L/D=1.9 (1.38/0.72). The sifter was rotated at 810 RPM (tip speed of 10.8 meters/second). In addition Pinnacle® paste extruded herbicide was separately sifted at 945 RPM (12.6 m/s) which reduced the average L/D of to a value of 2 (1.44/0.72). The two were mixed using a Munson Continuous Blender, fed by two loss in weight feeders at a feed ratio of 4.35 lbs/min Classic® to 2.3 lbs/min Pinnacle®. The resulting blend was tested and showed a level of homogeneity such that successive samples taken from the blender through time had an average composition of 8.8% of the Pinnacle® active ingredient versus a target of 8.6% and a relative standard deviation (RSD) in active ingredient composition of 3.8%, indicating excellent homogeneity.

EXAMPLE 10

Commercial scale Classic® herbicide and Authority® (FMC) herbicide were processed using a Kason Model YOB Centrifugal sifter. In order to produce materials with closely matching average L/D ratios, it was necessary to operate the sifter at 500 rpm (8 m/s) for Classic® and 200 rpm (3.5 m/s) for Authority®. Once this was accomplished, the resulting blend of the two materials produced a 3% RSD homogeneity level. Materials from the same sources which did not have such closely matching L/D ratios were tested in the laboratory and produced an inferior RSD of 10% which would not meet normal governmental requirements as could the blend with a 3% RSD.

What is claimed is:

1. A process for breaking dried particles and separating product particles from reject particles, comprising:
   (a) feeding dried particles, having an average length to diameter ratio from about 1.5 to 8, into an apparatus comprising
      (i) a substantially elongated hollow cylindrical screen
         (1) having a plurality of radial openings (4), each with a diameter smaller than the diameter of product particles;

(ii) an axially extending interior passage (3) formed radially inwardly of the cylindrical screen (1), wherein the radial openings (4) extend from the interior passage (3) through the screen (1), the interior passage (3) having an inlet (2) at one axial end thereof for receiving the dried feed particles and an outlet (10) at the other axial end thereof for expelling product particles;

(iii) vanes (8) rotatable around a hub (7) disposed in the interior passage (3); and (iv) a reject particle outlet (14) disposed radially outwardly of the screen for collecting reject particles expelled through the radial openings;

(b) controllably breaking the dried feed particles into product particles by rotating at least one of the cylindrical screen (1) and the vanes (8) to provide rotation of one relative to the other at a speed sufficient to break the dried feed particles into product particles having a mathematical average length to diameter ratio from about 1.0 to 4.0 with little loss of the product particles to fines;

(c) moving said product particles to the product particle outlet (10) and said reject particles radially outwardly through said radial openings (4); and (d) removing the product particles.

2. The process of claim 1, wherein the vanes (8) rotate and the screen (1) is stationary.

3. The process of claim 2, wherein the breakage is controlled by adjusting the speed of rotation and the apparatus further comprises means for varying the speed of rotation of the vanes (8).

4. The process of claim 1, wherein the screen (1) rotates and the vanes (8) are stationary.

5. The process of claim 4, wherein the breakage is controlled by adjusting the speed of rotation and the apparatus further comprises means for varying the speed of rotation of the screen (1).

6. The process of claim 1 wherein the feed particles comprise paste extruded particles.

7. The process of claim 1 wherein the feed particles comprise substantially cylindrical extruded particles.

8. The process of claim 1 wherein the speed of rotation of said screen or vanes is controlled to produce an average length to diameter ratio of the product particles from about 1.5 to about 2.8 with a standard deviation of less than 0.9.

* * * * *